US012631317B2

(12) United States Patent
Ji et al.

(10) Patent No.: US 12,631,317 B2
(45) Date of Patent: May 19, 2026

(54) LAMP ASSEMBLY

(71) Applicant: SAVANT TECHNOLOGIES LLC, East Cleveland, OH (US)

(72) Inventors: Minjie Ji, Shanghai (CN); Weikang Dai, Shanghai (CN); Huisheng Zhou, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 18/985,492

(22) Filed: Dec. 18, 2024

(65) Prior Publication Data

US 2025/0347399 A1 Nov. 13, 2025

(30) Foreign Application Priority Data

Dec. 29, 2023 (CN) ........................ 202323658634.X

(51) Int. Cl.

*F21V 21/04* (2006.01)
*F21S 8/02* (2006.01)
*F21V 1/24* (2006.01)
*F21V 9/40* (2018.01)

(52) U.S. Cl.

CPC ............ *F21V 21/044* (2013.01); *F21S 8/026* (2013.01); *F21V 1/24* (2013.01); *F21V 9/40* (2018.02)

(58) Field of Classification Search

CPC .. F21V 21/044; F21V 9/40; F21V 1/24; F21S 8/026

See application file for complete search history.

(56) References Cited

U.S. PATENT DOCUMENTS

| | | | | | |
|---|---|---|---|---|---|
| 6,082,878 | A * | 7/2000 | Doubek | ................ | F21V 17/164 362/365 |
| 2017/0009963 | A1 * | 1/2017 | Germain | ............... | F21V 21/042 |
| 2020/0096165 | A1 * | 3/2020 | Hou | ........................... | F21K 9/61 |
| 2024/0263766 | A1 * | 8/2024 | Zheng | ........................ | F21S 4/28 |

FOREIGN PATENT DOCUMENTS

| | | | | | |
|---|---|---|---|---|---|
| CN | 104315432 | A * | 1/2015 | .............. | F21S 8/026 |
| CN | 106678631 | A * | 5/2017 | .............. | F21V 29/89 |
| CN | 208332006 | U | 1/2019 | | |
| CN | 109506166 | A * | 3/2019 | .............. | F21S 8/026 |
| CN | 110145707 | A * | 8/2019 | .............. | F21V 21/02 |
| CN | 211011047 | U | 7/2020 | | |
| CN | 213362142 | U | 6/2021 | | |
| CN | 115046156 | A | 9/2022 | | |
| GB | 2633411 | A * | 3/2025 | .............. | F21S 8/026 |
| WO | WO-2015163556 | A1 * | 10/2015 | .............. | F21S 8/026 |

* cited by examiner

*Primary Examiner* — Zheng Song

(74) *Attorney, Agent, or Firm* — Wood IP, LLC; Theodore A. Wood

(57) ABSTRACT

Provided is a lamp assembly that includes a lamp body and spring clips for mounting the lamp body on a metal member having an opening for receiving the lamp body, and each of the spring clips includes a spring portion mounted on the lamp body and an elastic arm portion connected to the spring portion, the elastic arm portion being used for abutting against the metal member, the lamp assembly also includes insulation components arranged between the spring clips and the metal member such that in a state in which the lamp body is mounted on the metal member, the spring clips do not directly contact the metal member.

15 Claims, 18 Drawing Sheets

LAMP ASSEMBLY

CROSS-REFERENCE TO RELATED APPLICATIONS

This application claims priority to Chinese Patent Application Serial Number 202323658634.X, filed Dec. 29, 2023, which is herein incorporated by reference.

TECHNICAL FIELD

The present application generally relates to the field of illumination devices, and more particularly to a lamp assembly.

BACKGROUND

In conventional lamps, when contacting with a metal member to be mounted, an exposed metal portion of a lamp assembly may generate ghost light (i.e. a kind of blue light). This is an unsatisfactory effect and is undesirable to a user.

SUMMARY

In order to overcome the described defect existing in the prior art, the present application provides a lamp assembly, the lamp assembly comprising a lamp body and spring clips for mounting the lamp body on a metal member, wherein the metal member is provided with an opening for receiving the lamp body, and each of the spring clips comprises a spring portion mounted on the lamp body and an elastic arm portion connected to the spring portion, the elastic arm portion being used for abutting against the metal member, where in the lamp assembly further comprises insulation components, the insulation components being arranged between the spring clips and the metal member, such that in a state in which the lamp body is mounted on the metal member, the spring clips do not directly contact the metal member.

Further, the metal member is a metal pane, and comprises a main surface for cooperating with the spring clips and a circumferential side surface defining the opening.

Further, the insulation components are insulation sleeves for covering at least a part of the spring clips, and the insulation sleeves have a pouch shape which is shape-fitted with the spring clips.

Further, each of the insulation sleeves comprises a first portion for being sleeved on the spring portion and a second portion for being sleeved on the elastic arm portion, the first portion and the second portion being connected to each other.

Further, the second portion is fixed to the first portion.

Further, the second portion is swingable relative to the first portion.

Further, the first portion and the second portion are integral.

Further, the insulation components are insulation pads fixed on the metal member, and in a state in which the lamp body is mounted on the metal member, the elastic arm portions abut against the insulation pads.

Further, each of the insulation pads comprises a first pad portion and a second pad portion that are connected together at an angle to each other, the first pad portion being attached to the main surface, and the second pad portion being attached to the circumferential side surface.

Further, the metal member is a metal barrel lampshade; the metal barrel lampshade comprises elastic arm receiving portions provided on an inner wall thereof, and the elastic arm portions are used to be fastened on the elastic arm receiving portions.

Further, the insulation components are insulation sleeves for covering at least a part of the elastic arm portions, and the insulation sleeves are sleeved on the elastic arm portions.

Further, each of the elastic arm receiving portions comprises a first connection arm and a second connection arm opposite each other, and a third connection arm and a fourth connection arm opposite each other; the first connection arm is connected to the inner wall of the metal barrel lampshade, and the second connection arm is located on the radial inner side of the first connection arm inside the metal barrel lampshade and is spaced apart from the first connection arm; the third connection arm and the fourth connection arm are spaced apart from each other and are connected between the first connection arm and the second connection arm, respectively, such that an internal through opening is enclosed by the first connection arm, the second connection arm, the third connection arm and the fourth connection arm; and in a state in which the lamp body is mounted on the metal barrel lampshade, the elastic arm portions sleeved with the insulation sleeves pass through the internal through opening and abut against the third connection arm and the fourth connection arm.

Further, the insulation components are insulation pads fixed on the elastic arm receiving portions, and in a state in which the lamp body is mounted on the metal barrel lampshade, the elastic arm portions abut against the insulation pads.

Further, each of the elastic arm receiving portions comprises a first connection arm and a second connection arm opposite each other, and a third connection arm and a fourth connection arm opposite each other; the first connection arm is connected to the inner wall of the metal barrel lampshade, and the second connection arm is located on the radial inner side of the first connection arm inside the metal barrel lampshade and is spaced apart from the first connection arm; the third connection arm and the fourth connection arm are spaced apart from each other and are connected between the first connection arm and the second connection arm, respectively, such that an internal through opening is enclosed by the first connection arm, the second connection arm, the third connection arm and the fourth connection arm; and the insulation pads cover at least a part of the elastic arm portions, such that in a state in which the lamp body is mounted on the metal barrel lampshade, the elastic arm portions pass through the internal through opening and abut against the insulation pads.

Further, the insulation pad has a pouch shape which is shape-fitted with the elastic arm receiving portion, and the side of the insulation pad facing away from the opening is opened, such that the insulation pad can be sleeved on the elastic arm receiving portion.

Further, the lamp assembly comprises a plurality of the spring clips and a plurality of the insulation components, the number of the spring clips being equal to the number of the insulation components.

The present application further provides a lamp assembly, the lamp assembly comprising a lamp body and a back plate for mounting the lamp body on an octagonal box, wherein the back plate is provided on a back side of the lamp body and is connected to the lamp body, and the octagonal box is connected to the surface of the back plate facing away from the lamp body by one or more insulation screws, wherein the lamp assembly further comprises an insulation sheet, the insulation sheet being arranged between the back plate and the octagonal box, such that in a state in which the lamp body is mounted on the octagonal box, the back plate does not directly contact the octagonal box.

Further, the back plate is provided with one or more back plate through holes, and the insulation sheet is provided with one or more insulation sheet through holes; and each back plate through hole is aligned with a respective insulation sheet through hole, for a respective insulation screw to pass therethrough.

The lamp assembly in the present application can effectively prevent ghost light that might be generated due to the contact of an exposed metal portion of a lamp with a metal member to be mounted.

BRIEF DESCRIPTION OF THE DRAWINGS

The drawings for providing further understanding of the present application constitute a part of the present application, and the illustrative embodiments of the present application and illustrations thereof are used to explain the present application, rather than constitute inappropriate limitation on the present application. In the drawings.

DETAILED DESCRIPTION OF THE EMBODIMENTS

Figure 1:
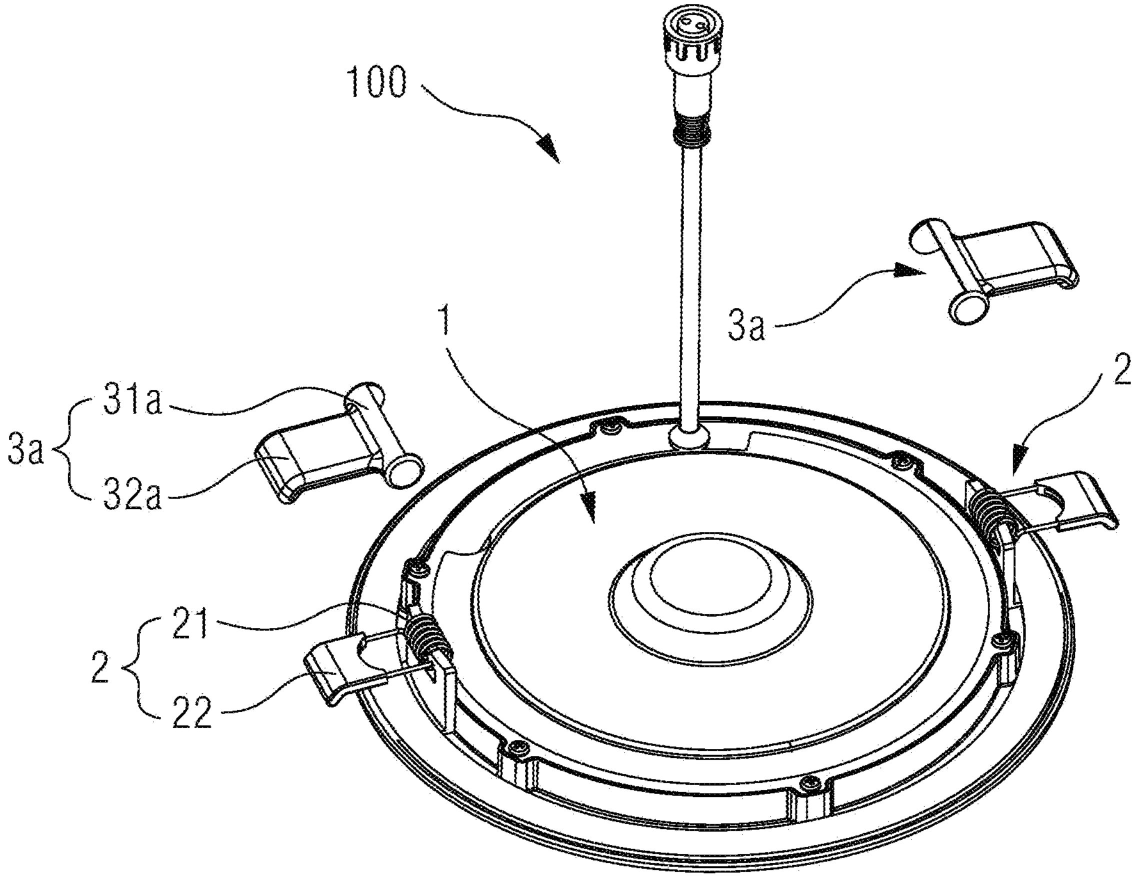
FIG. 1 is a schematic exploded perspective view showing a lamp assembly according to a first embodiment of the present application.
Figure 2:
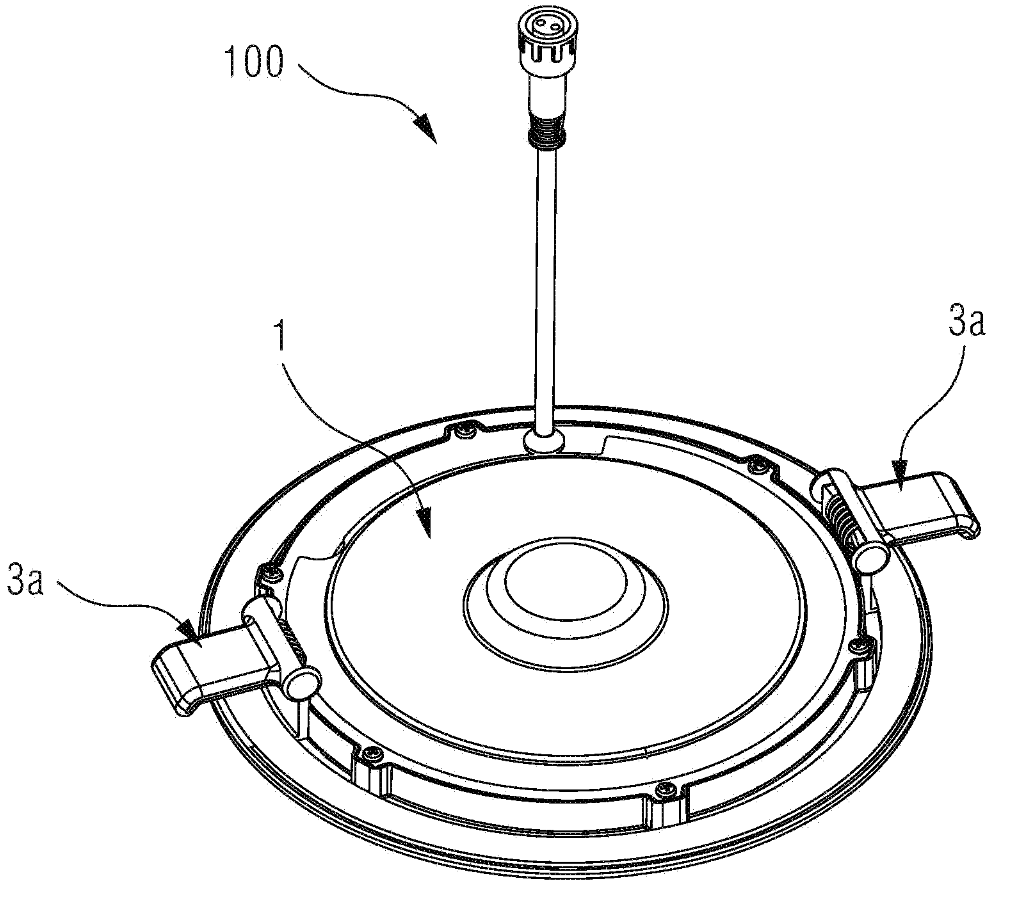
FIG. 2 is a schematic perspective view showing a lamp assembly according to a first embodiment of the present application.
Figure 3:
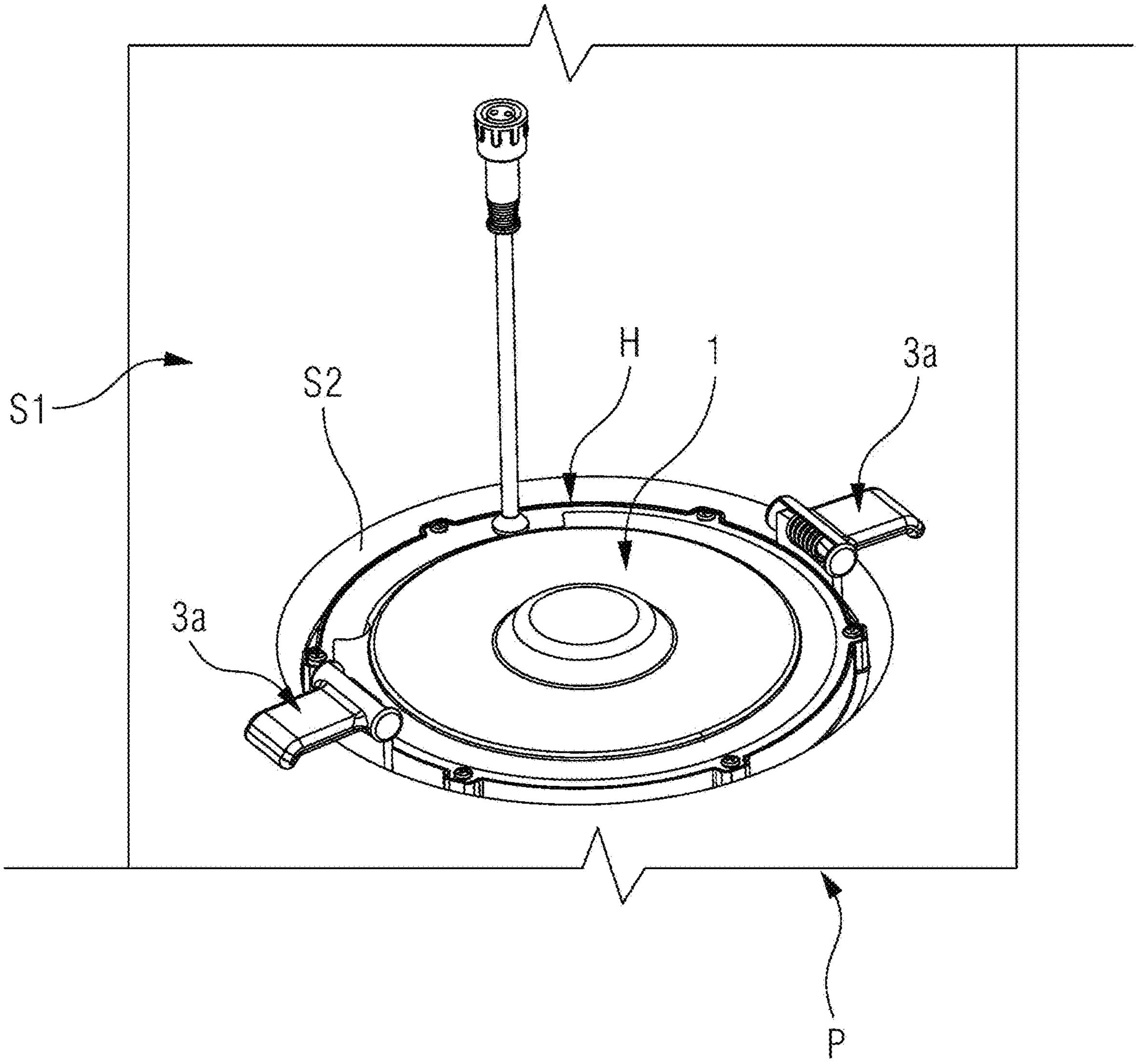
FIG. 3 is a schematic perspective view showing the lamp assembly of FIG. 2 mounted on a metal member.
Figure 4:
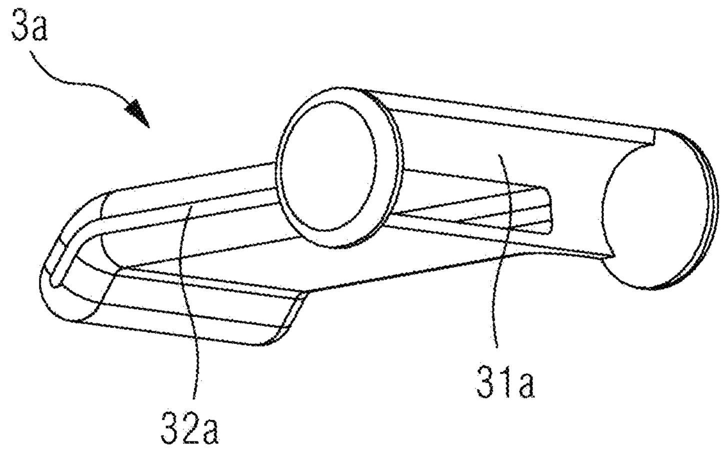
FIG. 4 is a schematic perspective view showing an insulation component according to a first embodiment of the present application.
Figure 5:
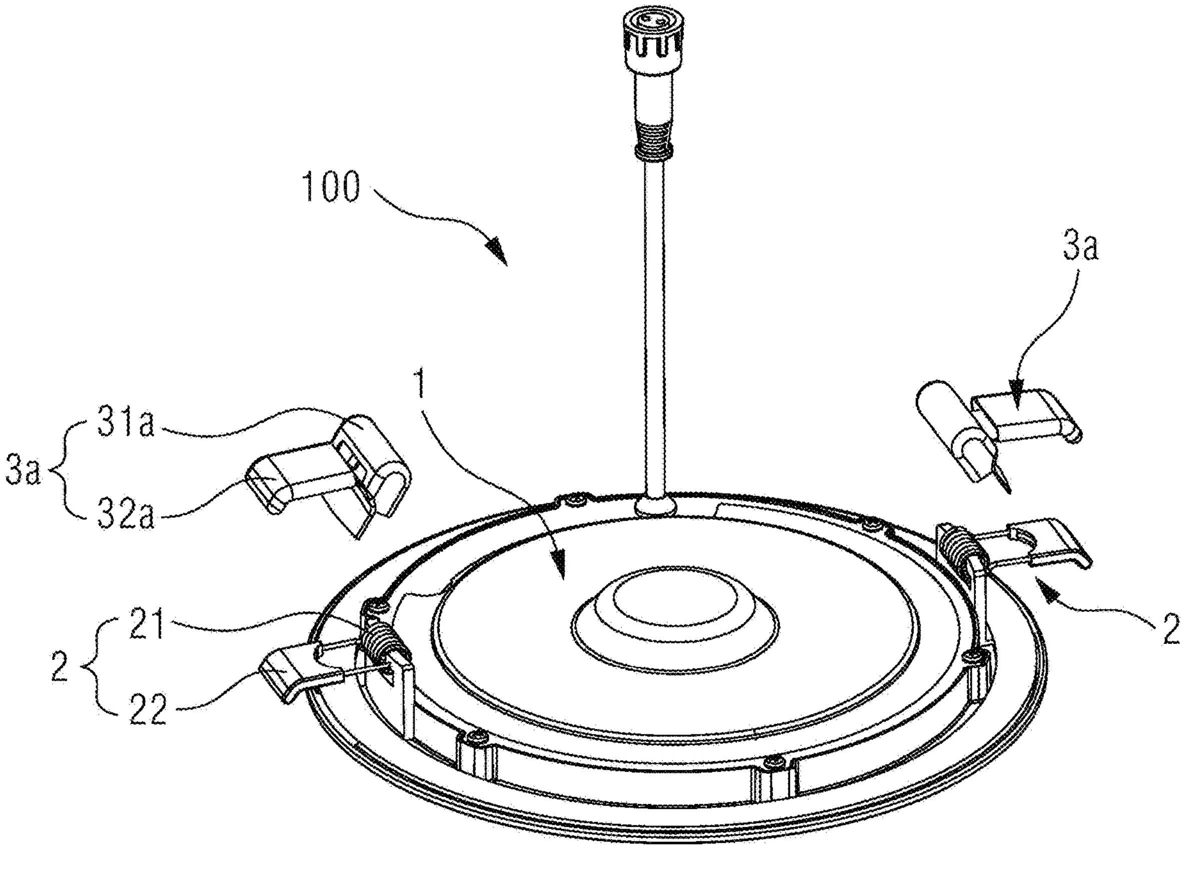
FIG. 5 is a schematic exploded perspective view showing a lamp assembly according to a second embodiment of the present application.
Figure 6:
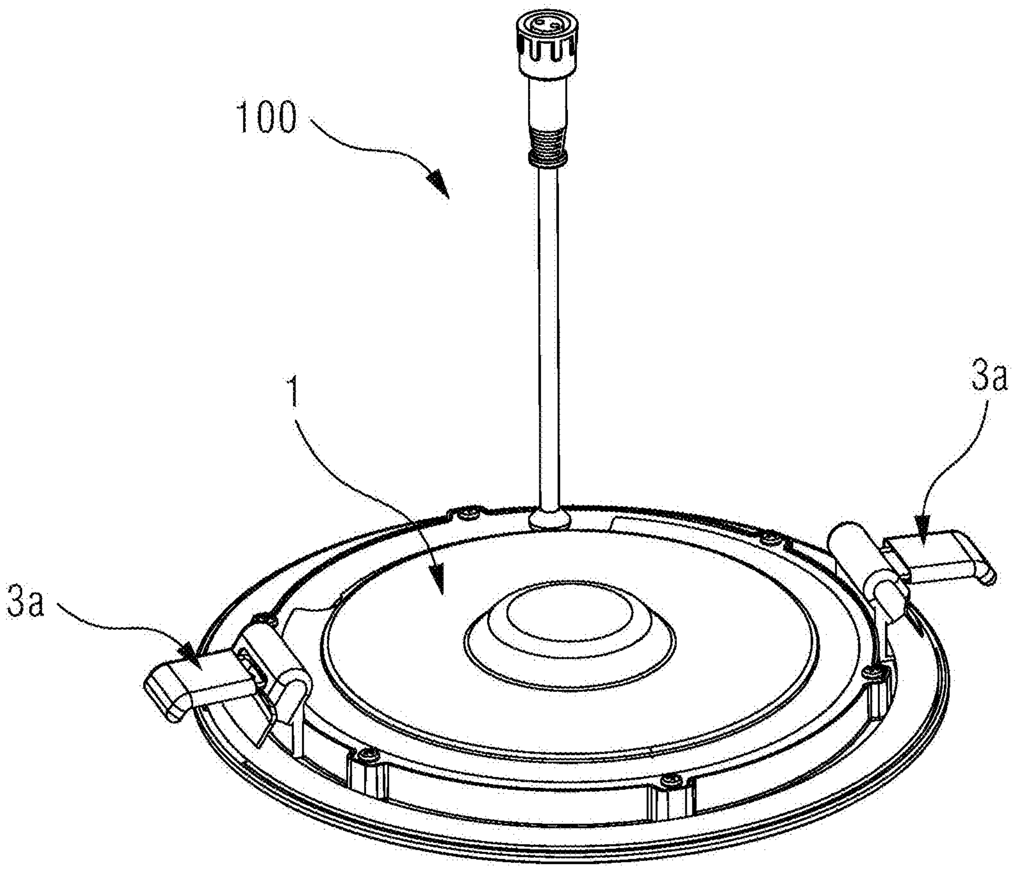
FIG. 6 is a schematic perspective view showing a lamp assembly according to a second embodiment of the present application.
Figure 7:
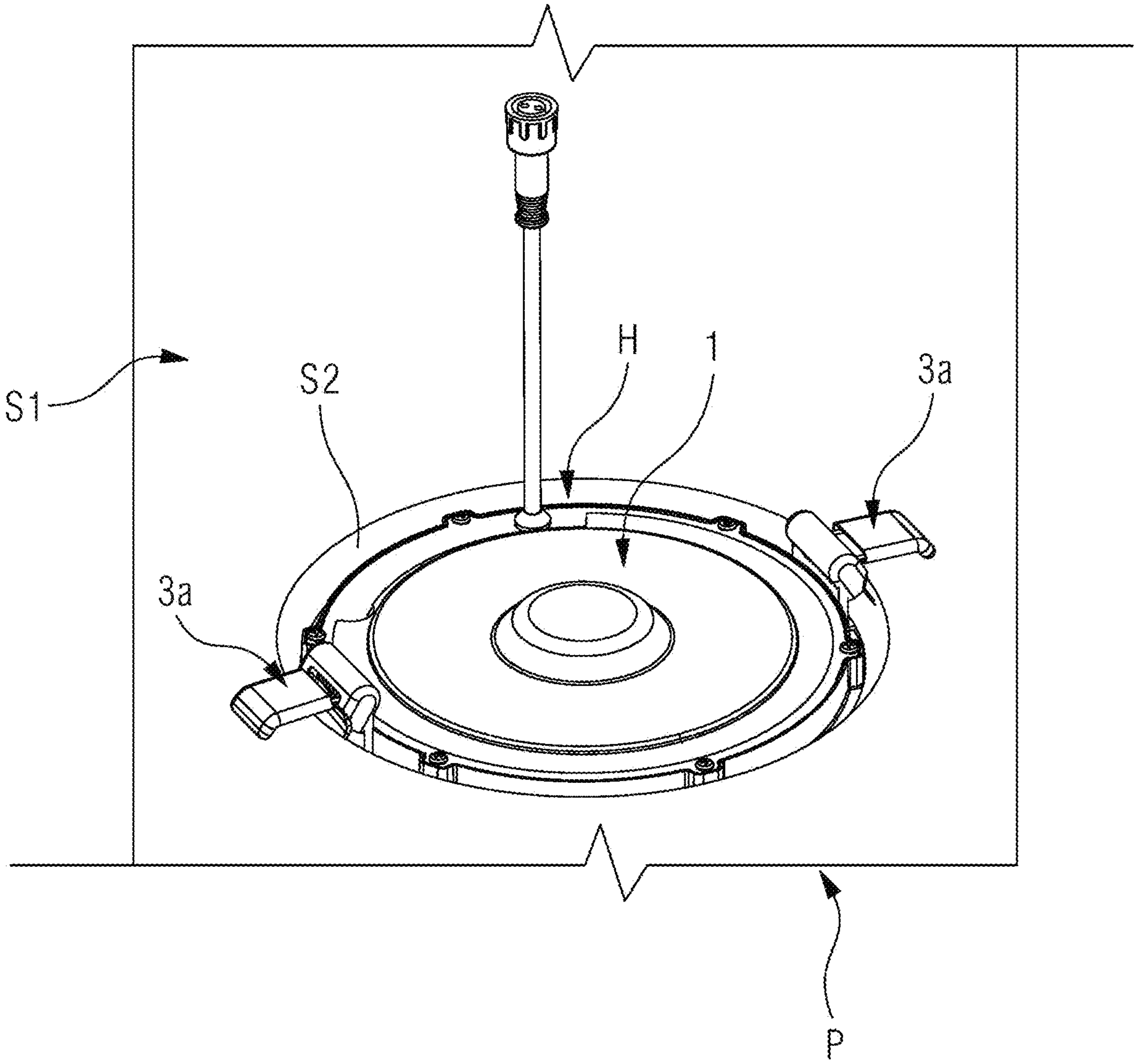
FIG. 7 is a schematic perspective view showing the lamp assembly of FIG. 6 mounted on a metal member.

Hereinafter, the technical solutions in the embodiments of the present application will be described in detail with reference to the accompanying drawings in the embodiments of the present application. It should be noted that the embodiments in the present application and features in the embodiments can be combined with each other without conflicts.

In the following detailed illustration, reference is made to the accompanying drawings which form a part of the present description, in which specific embodiments which can implement the present application are shown by way of illustration. With regard to the drawings, directional terms, such as “top”, “bottom”, “inner”, “outer”, “upper”, “lower”, “front”, “rear”, and the like, are used with reference to the directions of the drawings as described. As assemblies of embodiments of the present application may be placed in many different directions, the directional terms are used for purposes of illustration only, and are not intended for limiting. It is to be understood that other embodiments may be used, and structural or logical changes may be made without departing from the scope of the present application. Therefore, the following detailed illustration should not be understood as limiting, and the present application is defined by the appended claims.

Referring to the drawings, the present application provides a lamp assembly 100, 100', 100".

Referring to FIGS. 1-17, the lamp assembly 100, 100' may generally comprise a lamp body 1, 1' and spring clips 2, 2' for mounting the lamp body 1, 1' on a metal member. An opening H, H' for receiving the lamp body 1, 1' is provided in the metal member. Each of the spring clips 2, 2' may comprise a spring portion 21, 21' mounted on the lamp body 1, 1' and an elastic arm portion 22, 22' connected to the spring portion 21, 21', the elastic arm portion 22, 22' being used to abut against the metal member. The lamp assembly 100, 100' may also comprise insulation components. The insulation components are arranged between the spring clips 2, 2' and the metal member, such that in a state in which the lamp body 1, 1' is mounted on the metal member, the spring clips 2, 2' do not directly contact the metal member.

Here the spring clips 2, 2' may, for example, be pivotably connected to the lamp body 1, 1', such as being mounted pivotably about an axis, or the spring clips 2, 2' may be connected to the lamp body 1, 1' in a manner that two ends thereof are fixed.

In a first embodiment (e.g. as shown with reference to FIGS. 1 to 4), a second embodiment (e.g. as shown with reference to FIGS. 5 to 8) and a third embodiment (e.g. as shown with reference to FIGS. 9 to 11) of the present application, the metal member may be a metal panel P (e.g. a ceiling or other panels), and comprise a main surface S1 for cooperating with the spring clips 2 and a circumferential side surface S2 defining the opening H. In other words, the lamp is of an embedded type.

In the first embodiment (e.g. as shown with reference to FIGS. 1 to 4) and the second embodiment (e.g. as shown with reference to FIGS. 5 to 8) of the present application, the insulation components may be insulation sleeves 3*a* for covering at least a part of the spring clips 2, and the insulation sleeves 3*a* may have a pouch shape which is shape-fitted with the spring clips 2. Accordingly, it can be ensured that the spring clips 2 do not contact the metal panel P, thereby preventing the generation of ghost light.

Figure 8:
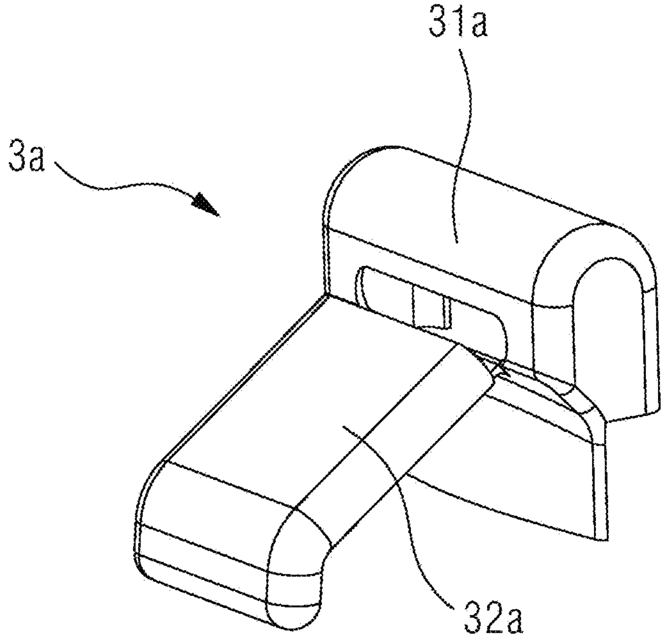
FIG. 8 is a schematic perspective view showing an insulation component according to a second embodiment of the present application.
Figure 9:
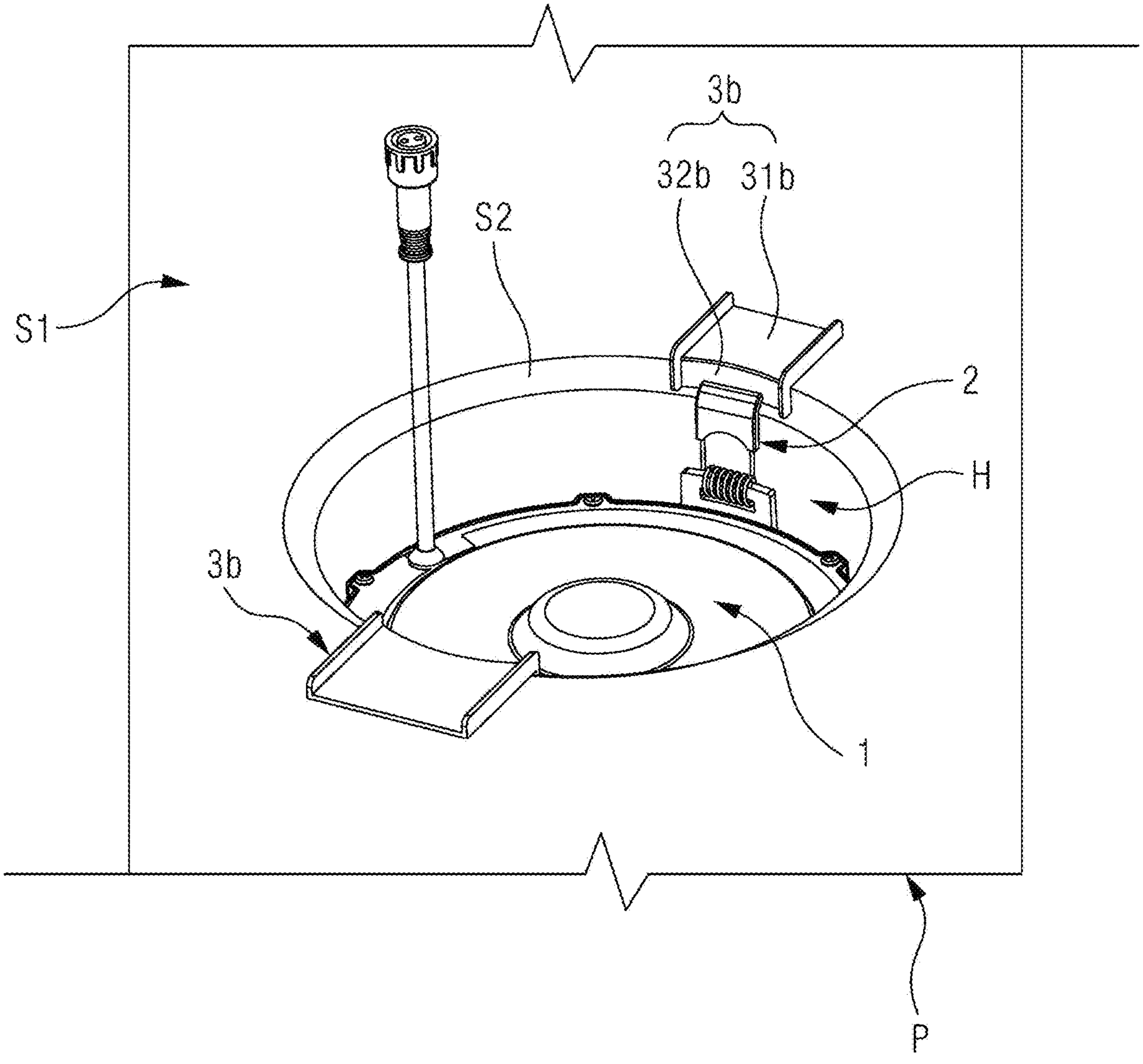
FIG. 9 is a schematic exploded perspective view showing a lamp assembly according to a third embodiment of the present application, wherein a metal member to which the lamp assembly is to be mounted is further shown.
Figure 10:
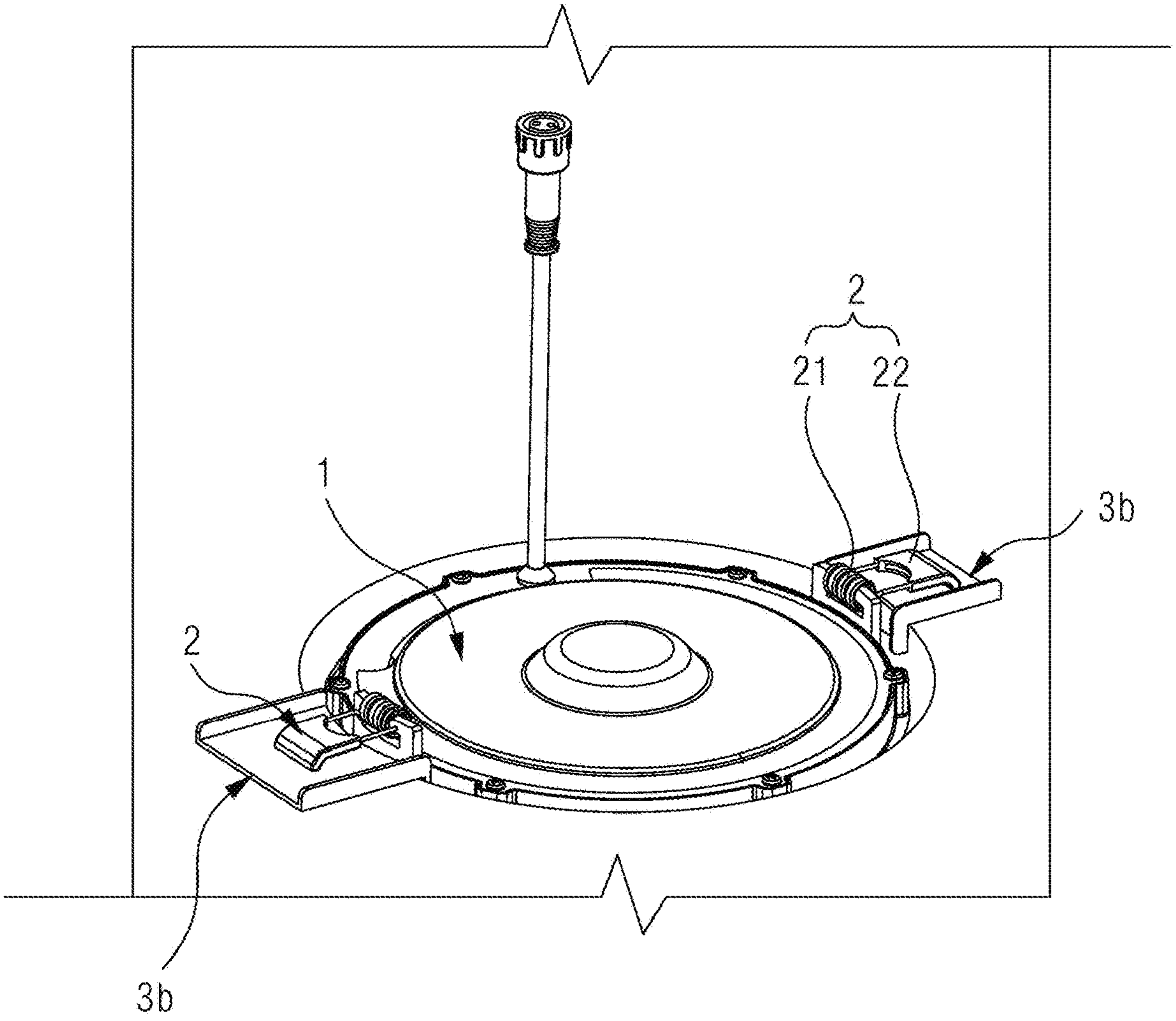
FIG. 10 is a schematic perspective view showing a lamp assembly according to a third embodiment of the present application, wherein the lamp assembly is mounted on a metal member.
Figure 11:
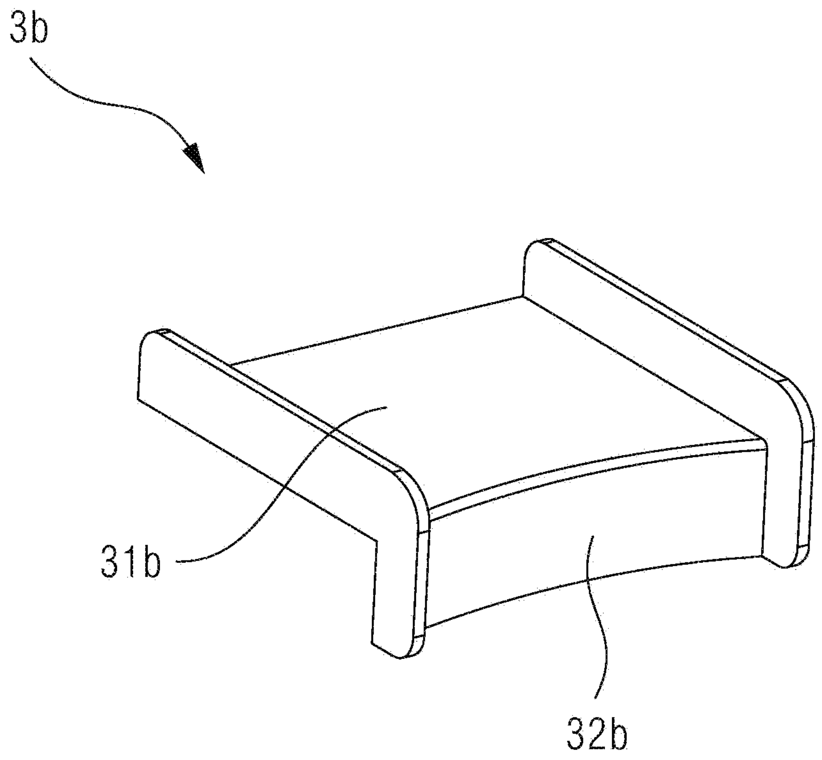
FIG. 11 is a schematic perspective view showing an insulation component according to a third embodiment of the present application.
Figure 12:
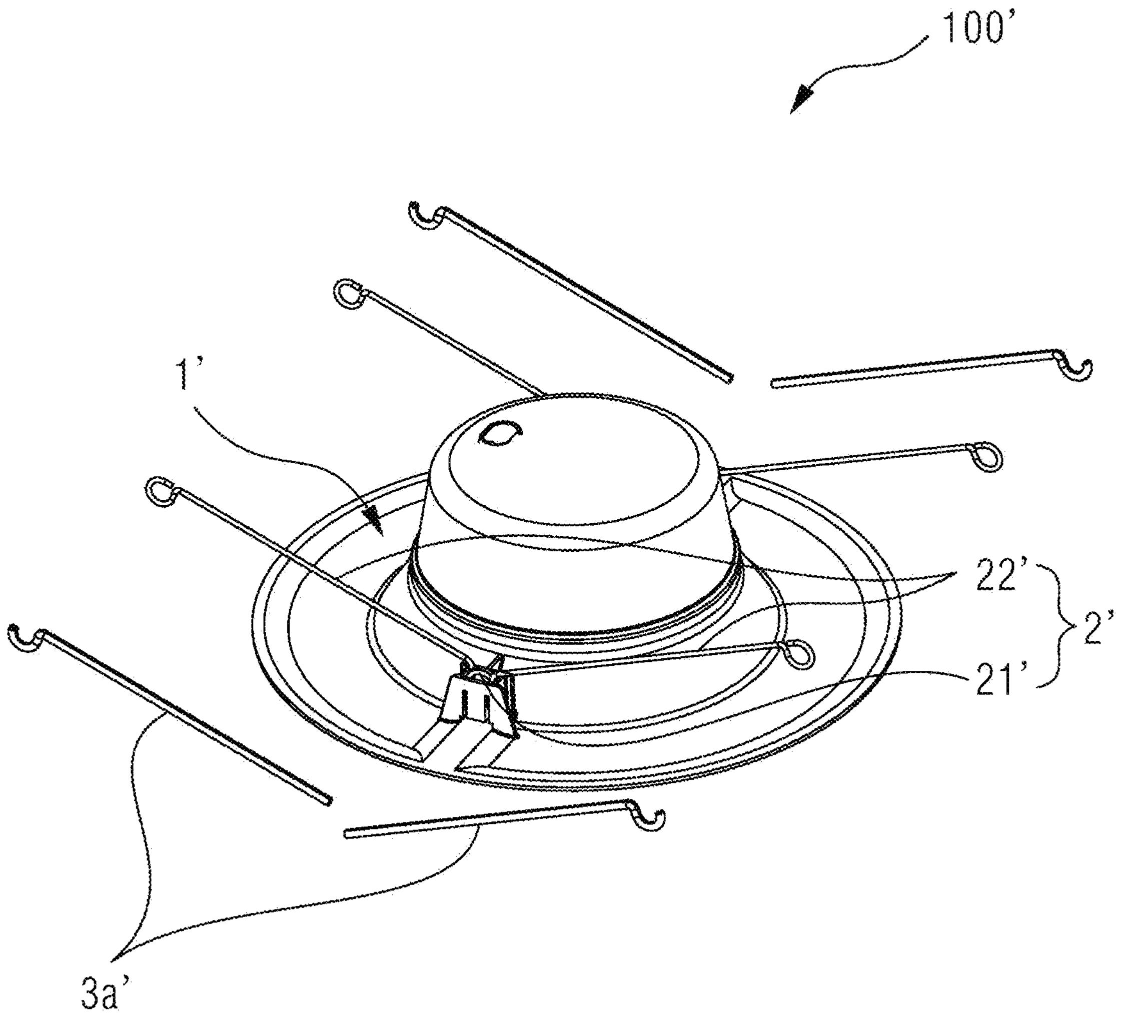
FIG. 12 is a schematic exploded perspective view showing a lamp assembly according to a fourth embodiment of the present application.
Figure 13:
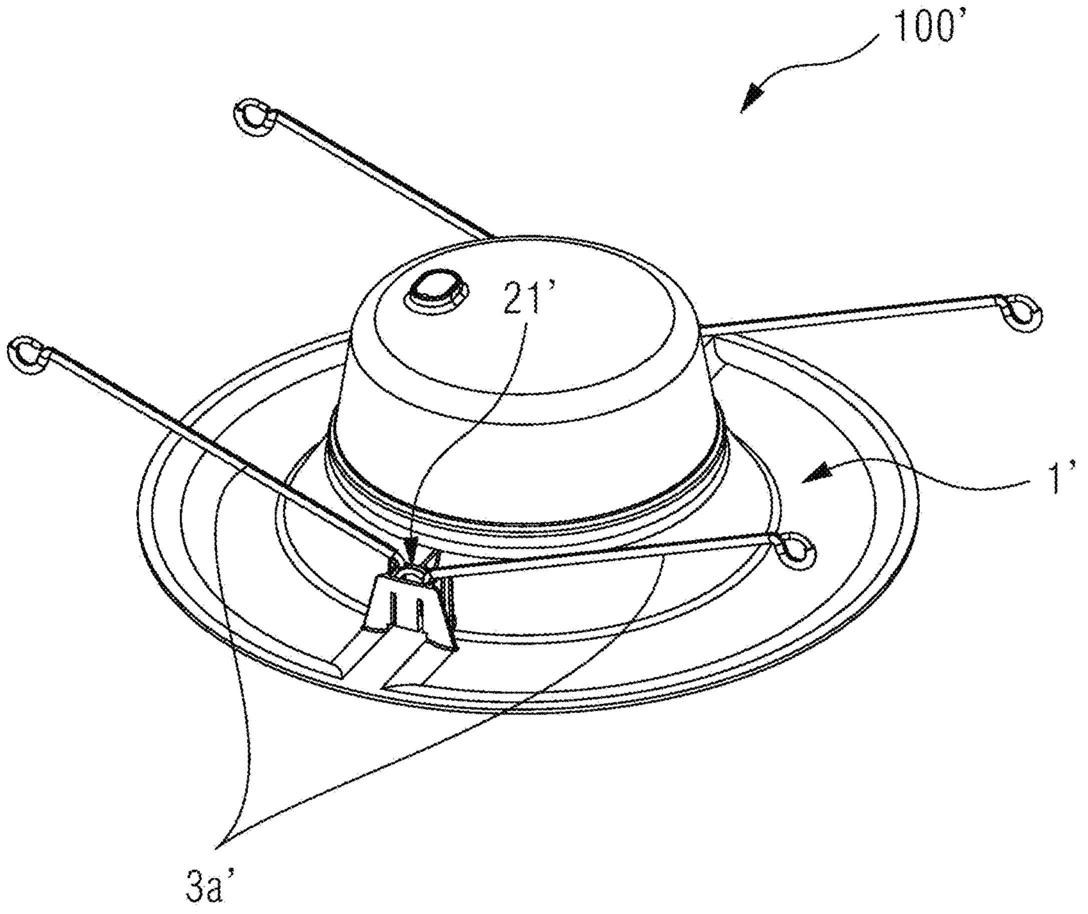
FIG. 13 is a schematic perspective view showing a lamp assembly according to a fourth embodiment of the present application.
Figure 14:
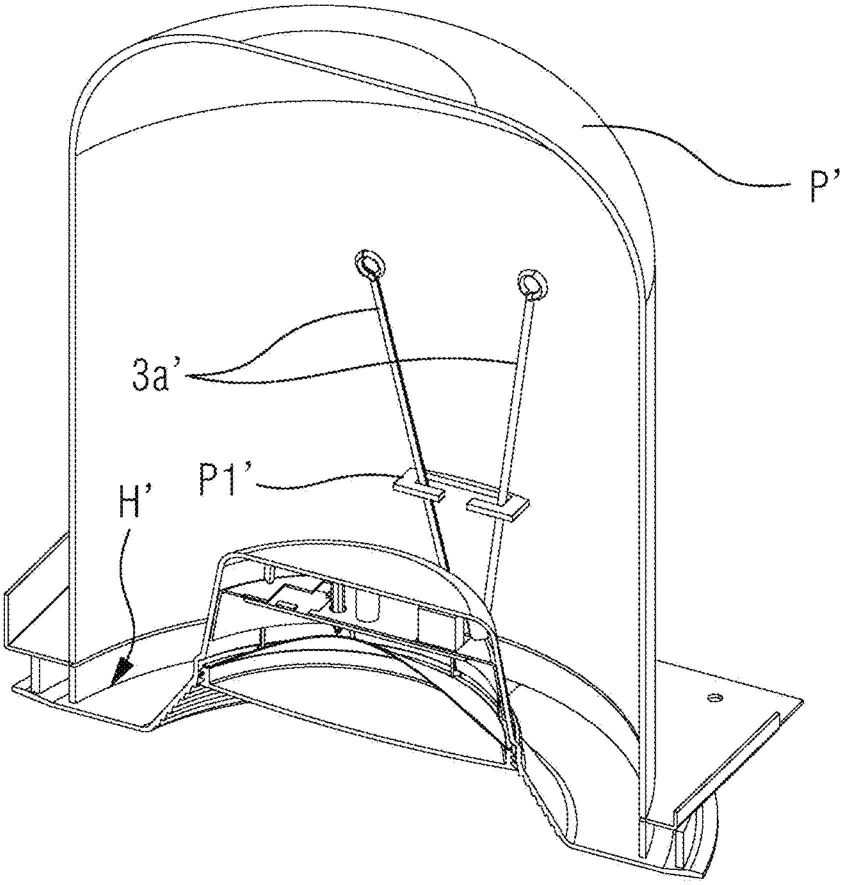
FIG. 14 is a schematic sectional perspective view showing the lamp assembly of FIG. 13 mounted on a metal member.
Figure 15:
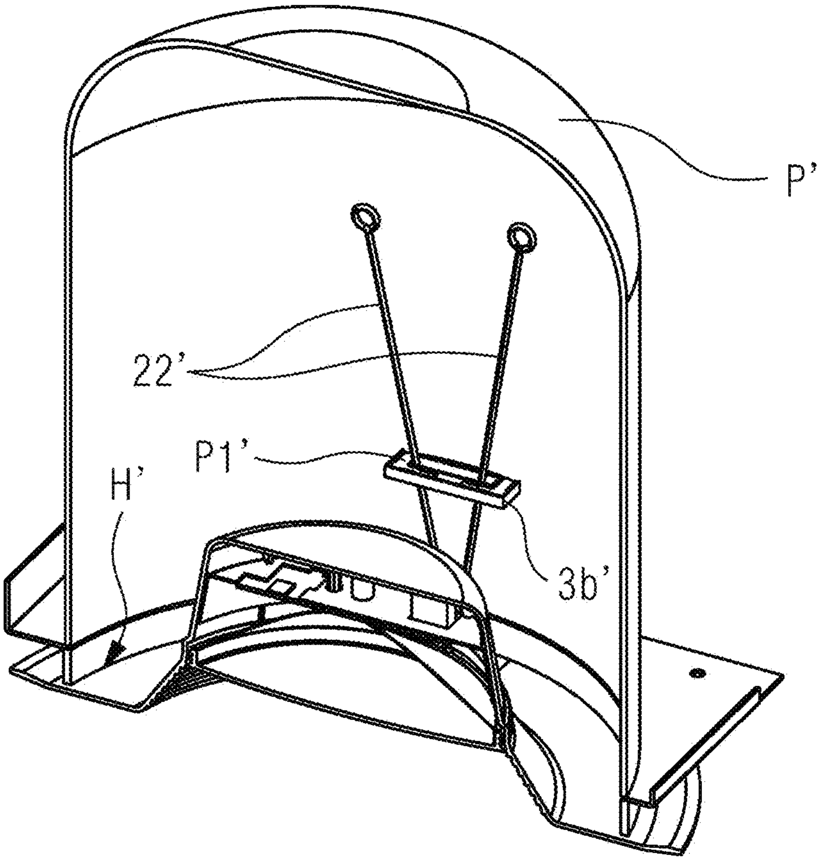
FIG. 15 is a schematic sectional perspective view showing a lamp assembly according to a fifth embodiment of the present application, wherein the lamp assembly is mounted on a metal member.
Figure 16:
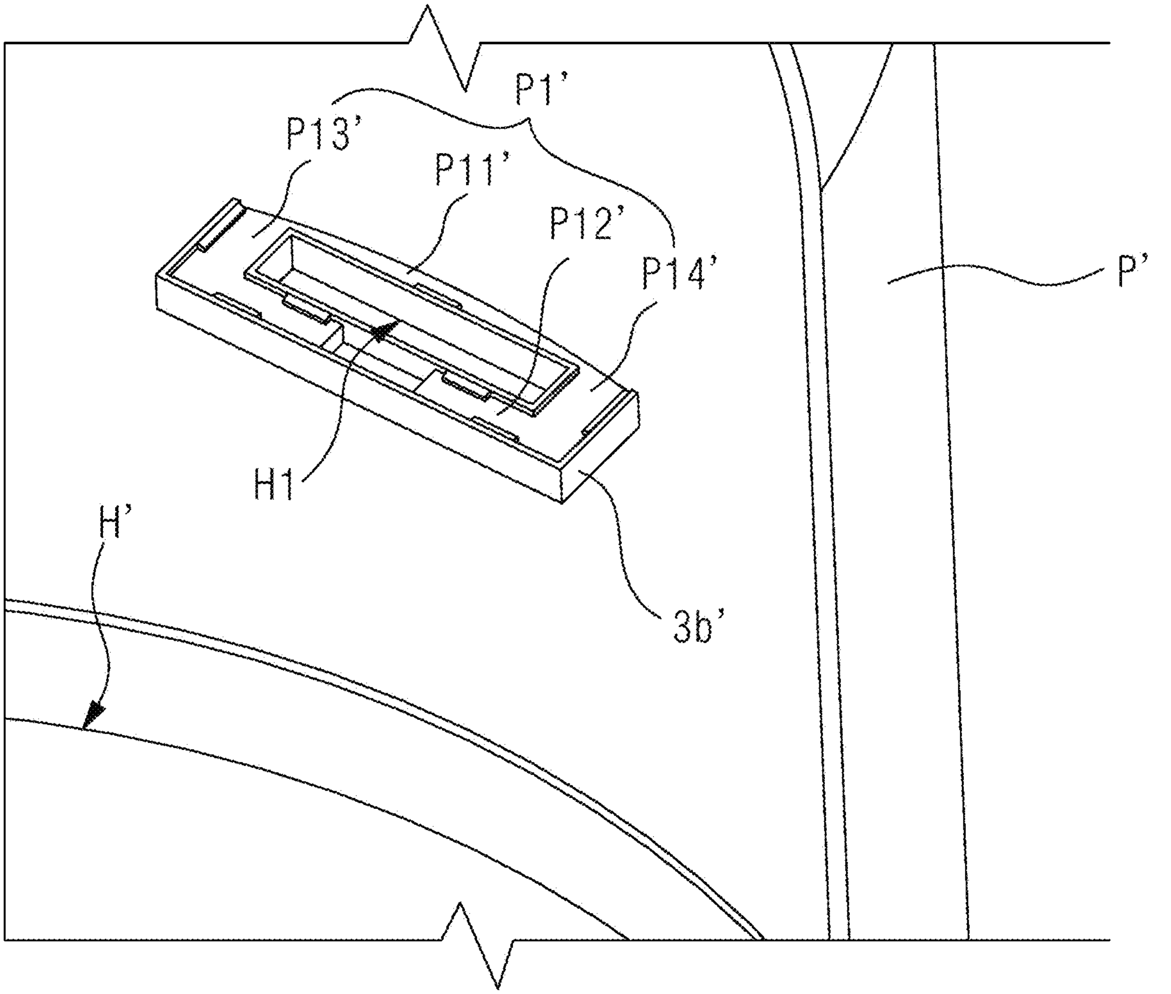
FIG. 16 is a schematic perspective view showing an insulation component according to a fifth embodiment of the present application, wherein the insulation component is mounted on an elastic arm receiving portion.
Figure 17:
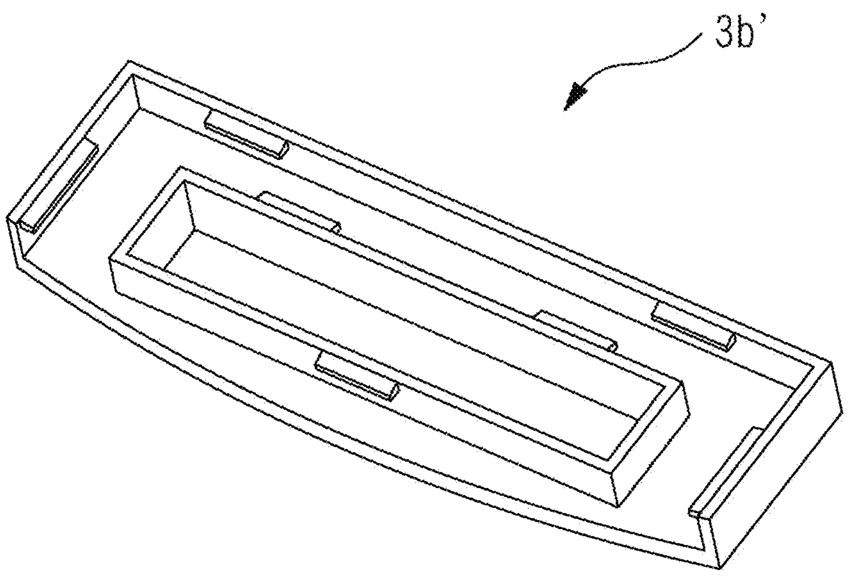
FIG. 17 is a schematic perspective view showing an insulation component according to a fifth embodiment of the present application.

In particular, each of the insulation sleeves 3*a* may comprise a first portion 31*a* for being sleeved on the spring portion 21 and a second portion 32*a* for being sleeved on the elastic arm portion 22, and the first portion 31*a* and the second portion 32*a* are connected to each other. In particular, as shown in the first embodiment of the present application, the second portion 32*a* may be fixed to the first portion 31*a*, whereby, when the spring clip 2 pivots, the insulation sleeve 3*a* as a whole pivots together with the spring clip 2. In particular, as shown in the second embodiment of the present application, the second portion 32*a* is swingable relative to the first portion 31*a*. Specifically, as shown in FIG. 8, only the lower portion of the edge of the second portion 32*a* is connected to the first portion 31*a*, and the upper portion of the edge is disconnected, and accordingly, swinging of the second portion 32*a* relative to the first portion 31*a* can be achieved, such that when the spring clip 2 pivots, the extent of pivoting of the second portion 32*a* is greater than the extent of pivoting of the first portion 31*a*, and even the first portion 31*a* may not pivot.

In particular, the first portion 31*a* and the second portion 32*a* may be integral, i.e. integrally formed.

In the third embodiment (for example, as shown with reference to FIGS. 9 to 11) of the present application, the insulation components may be insulation pads 3*b* fixed on the metal member. In a state in which the lamp body 1 is mounted on the metal member, the elastic arm portions 22 may abut against the insulation pads 3*b*. Accordingly, it can be ensured that the spring clips 2 do not contact the metal panel P, thereby preventing the generation of ghost light.

In particular, each of the insulation pads 3*b* may comprise a first pad portion 31*b* and a second pad portion 32*b* that are connected together at an angle to each other (e.g. perpendicular to each other). The first pad portion 31*b* may be attached to the main surface S1, and the second pad portion 32*b* may be attached to the circumferential side surface S2.

In a fourth embodiment (e.g. as shown with reference to FIGS. 12 to 14) and a fifth embodiment (e.g. as shown with reference to FIGS. 15 to 17) of the present application, the metal member may be a metal barrel lampshade P'; the metal barrel lampshade P' may comprise elastic arm receiving portions P1' provided on the inner wall of thereof, and the elastic arm portions 22' are used to be fastened on the elastic arm receiving portions P1'. In other words, the lamp is barrel-mounted.

In the fourth embodiment (e.g. as shown with reference to FIGS. 12 to 14) of the present application, the insulation components may be insulation sleeves 3*a'* for covering at least a part of the elastic arm portions 22', and the insulation sleeves 3*a'* are sleeved on the elastic arm portions 22', for example, the insulation sleeves may be closely fitted with the shape of the elastic arm portions 22' so as to be connected to the elastic arm portions 22'. Accordingly, it can be ensured that the spring clips 2' do not contact the metal barrel lampshade P', thereby preventing the generation of ghost light.

In particular, each of the elastic arm receiving portions P1' may comprise a first connection arm P11' and a second connection arm P12' opposite each other, and a third connection arm P13' and a fourth connection arm P14' opposite each other, the four connection arms substantially having a shape of Chinese character "回". The first connection arm P11' is connected to the inner wall of the metal barrel lampshade P', for example, a portion of the first connection arm P11' connected to the inner wall of the metal barrel lampshade P' has a shape conforming to the inner wall, such as a curved shape. The second connection arm P12' is located on the radial inner side of the first connection arm P11' inside the metal barrel lampshade P', and is spaced apart from the first connection arm P11'. The third connection arm P13' and the fourth connection arm P14' are spaced apart from each other and are connected between the first connection arm P11' and the second connection arm P12', respectively, such that an internal through opening H1 is enclosed by the first connection arm P11', the second connection arm P12', the third connection arm P13' and the fourth connection arm P14'. In a state in which the lamp body 1' is mounted on the metal barrel lampshade P', the elastic arm portions 22' sleeved with the insulation sleeves 3*a'* can pass through the internal through opening H1 and abut against the third connection arm P13' and the fourth connection arm P14'.

In the fifth embodiment (for example, as shown with reference to FIGS. 15 to 17) of the present application, the insulation components may be insulation pads 3*b'* fixed to the elastic arm receiving portions P1', and in a state in which the lamp body 1' is mounted on the metal barrel lampshade P', the elastic arm portions 22' may abut against the insulation pads 3*b'*. Accordingly, it can be ensured that the spring clips 2' do not contact the metal barrel lampshade P', thereby preventing the generation of ghost light.

In particular, the elastic arm receiving portion P1' may have a structural arrangement similar to that in the fourth embodiment. The insulation pads 3*b'* may cover at least a part of the elastic arm portions 22', such that in a state in which the lamp body 1' is mounted on the metal barrel lampshade P', the elastic arm portions 22' can pass through the internal through opening H1 and abut against the insulation pad 3*b'*, that is, abut against the insulation pad 3*b'* covering the elastic arm portions 22'.

In particular, the insulation pad 3*b'* may have a pouch shape which is shape-fitted with the elastic arm receiving portion P1', and the side of the insulation pad 3*b'* facing away from the opening H' is opened, such that the insulation pad 3*b'* can be sleeved on the elastic arm receiving portion P1'. Accordingly, the installation of the insulation pads 3*b'* can be facilitated.

In these embodiments as described above, the lamp assembly 100, 100' may comprise a plurality of spring clips 2, 2' and a plurality of insulation components, the number of the spring clips 2, 2' being equal to the number of the insulation components.

Furthermore, in these embodiments as described above, the insulation components are made of plastic or silicone.

Figure 18:
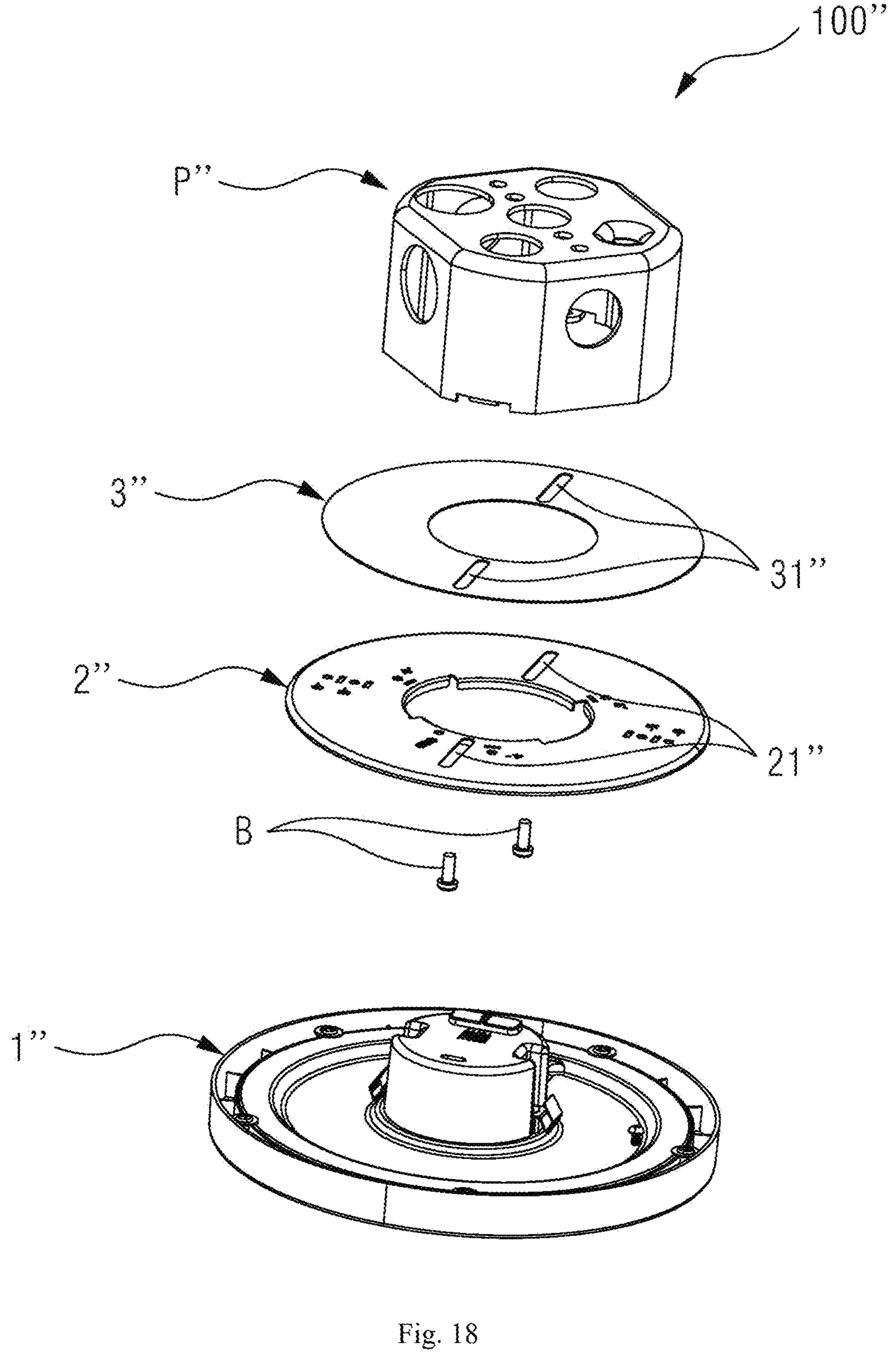
FIG. 18 is a schematic exploded perspective view showing a lamp assembly according to a sixth embodiment of the present application.

In a sixth embodiment (for example, as shown with reference to FIG. 18) of the present application, the present application further provides a lamp assembly 100", which may generally comprise a lamp body 1" and a back plate 2" for installing the lamp body 1" on an octagonal box P". The back plate 2" is provided on the back side (i.e. the side opposite the irradiation direction of the lamp) of the lamp body 1" and is connected to the lamp body 1". The octagonal box P" can be connected to the surface of the back plate 2" facing away from the lamp body 1" by one or more insulation screws B (e.g. two insulation screws B are shown in FIG. 18). In other words, the lamp is surface-mounted. The lamp assembly 100" may further comprise an insulation sheet 3", the insulation sheet 3" is arranged between the back plate 2" and the octagonal box P", such that in a state in which the lamp body 1" is installed on the octagonal box P", the back plate 2" does not directly contact the octagonal box P". Accordingly, it can be ensured that the back plate 2" does not contact the octagonal box P", thereby preventing the generation of ghost light.

In particular, the back plate 2" may be provided with one or more back plate through holes 21", and the insulation sheet 3" may be correspondingly provided with one or more insulation sheet through holes 31". Each back plate through hole 21" is aligned with a respective insulation sheet through hole 31", to allow a respective insulation screw B to pass therethrough.

In particular, the insulation sheet 3" may be made of plastic or silicone.

The arrangement manner of the present application can effectively prevent the generation of ghost light, can facilitate the operation of a user, has a simple structure, and can be adapted to various existing structures.

The content above merely relates to preferred embodiments of the present application and is not intended to limit the present application. For a person skilled in the art, the present application may have various modifications and variations. Any modifications, equivalent replacements, improvements, etc. made within the spirit and principle of the present application shall all belong to the scope of protection of the present application.

The invention claimed is:

1. A lamp assembly comprising a lamp body and spring clips for mounting the lamp body on a metal member, wherein the metal member is provided with an opening for receiving the lamp body, and each of the spring clips comprises a spring portion mounted on the lamp body and an elastic arm portion connected to the spring portion, the elastic arm portion being used for abutting against the metal member, wherein the lamp assembly further comprises insulation sleeves, each of the insulation sleeves comprising a first portion sleeved on the spring portion and a second portion sleeved on the elastic arm portion, the first portion and the second portion being connected to each other and formed of electrically insulating material and arranged between the spring clips and the metal member, such that in a state in which the lamp body is mounted on the metal member, the spring clips are physically separated from and do not directly contact the metal member.

2. The lamp assembly according to claim 1, wherein the metal member comprises a main surface for cooperating with the spring clips and a circumferential side surface defining the opening.

3. The lamp assembly according to claim 2, wherein the insulation sleeves have a pouch shape which is shape-fitted with the spring clips.

4. The lamp assembly according to claim 1, wherein the second portion is fixed to the first portion.

5. The lamp assembly according to claim 1, wherein the second portion is swingable relative to the first portion.

6. The lamp assembly according to claim 1, wherein the first portion and the second portion are integral.

7. A lamp assembly comprising a lamp body and spring clips for mounting the lamp body on a conductive member, wherein the conductive member is provided with an opening for receiving the lamp body, and each of the spring clips comprises a spring portion mounted on the lamp body and an elastic arm portion connected to the spring portion, the elastic arm portion being used for abutting against the conductive member, wherein the lamp assembly further comprises insulation pads fixed on the conductive member, and in a state in which the lamp body is mounted on the conductive member, the elastic arm portions abut against the insulation pads, and the spring clip are physically separated from and do not directly contact the conductive member.

8. The lamp assembly according to claim 7, wherein the conductive member is a metal barrel lampshade;

the metal barrel lampshade comprises elastic arm receiving portions provided on an inner wall thereof, and the elastic arm portions are used to be fastened on the elastic arm receiving portions.

9. The lamp assembly according to claim 8, wherein the insulation pads fixed on the elastic arm receiving portions, and in a state in which the lamp body is mounted on the metal barrel lampshade, the elastic arm portions abut against the insulation pads.

10. The lamp assembly according to claim 9, wherein each of the elastic arm receiving portions comprises a first connection arm and a second connection arm opposite each other, and a third connection arm and a fourth connection arm opposite each other;

the first connection arm is connected to the inner wall of the metal barrel lampshade, and the second connection arm is located on the radial inner side of the first connection arm inside the metal barrel lampshade and is spaced apart from the first connection arm;

the third connection arm and the fourth connection arm are spaced apart from each other and are connected between the first connection arm and the second connection arm, respectively, such that an internal through opening is enclosed by the first connection arm, the second connection arm, the third connection arm and the fourth connection arm; and the insulation pads cover at least a part of the elastic arm portions, such that in a state in which the lamp body is mounted on the metal barrel lampshade, the elastic arm portions pass through the internal through opening and abut against the insulation pads.

11. The lamp assembly according to claim 10, wherein the insulation pad has a pouch shape which is shape-fitted with the elastic arm receiving portion, and the side of the insulation pad facing away from the opening is opened, such that the insulation pad can be sleeved on the elastic arm receiving portion.

12. The lamp assembly according to claim 11, wherein the lamp assembly comprises a plurality of the spring clips and a plurality of the insulation components, the number of the spring clips being equal to the number of the insulation components.

13. The lamp assembly according to claim 8, wherein each of the elastic arm receiving portions comprises a first connection arm and a second connection arm opposite each other, and a third connection arm and a fourth connection arm opposite each other;

the first connection arm is connected to the inner wall of the metal barrel lampshade, and the second connection arm is located on the radial inner side of the first connection arm inside the metal barrel lampshade and is spaced apart from the first connection arm;

the third connection arm and the fourth connection arm are spaced apart from each other and are connected between the first connection arm and the second connection arm, respectively, such that an internal through opening is enclosed by the first connection arm, the second connection arm, the third connection arm and the fourth connection arm; and in a state in which the lamp body is mounted on the metal barrel lampshade, the elastic arm portions sleeved with the insulation sleeves pass through the internal through opening and abut against the third connection arm and the fourth connection arm.

14. The lamp assembly according to claim 7, wherein each of the insulation pads comprises a first pad portion and a second pad portion that are connected together at an angle to each other, the first pad portion being attached to a main surface of the conductive member for cooperating with the spring clips and a circumferential side surface defining the opening, and the second pad portion being attached to the circumferential side surface.

15. A lamp assembly comprising a lamp body and a back plate for mounting the lamp body on an electrical metal box, wherein the back plate is provided on a back side of the lamp body and is connected to the lamp body, and the electrical metal box is connected to the surface of the back plate facing away from the lamp body by one or more insulation screws, wherein the lamp assembly further comprises an insulation sheet of electrically insulating material disposed between the back plate and the electrical metal box, the insulation sheet having through holes aligned with through holes of the back plate so that the insulation screws extend therethrough, such that in a state in which the lamp body is mounted on the electrical metal box, the back plate is insulated from and does not directly contact the electrical metal box.

* * * * *